Dec. 1, 1931.                    J. R. SCHALK                    1,834,425

RAIL LOCKING DEVICE

Filed July 25, 1929

INVENTOR.
Jacob Ruppert Schalk,
BY John J. Thompson
ATTORNEYS.

Patented Dec. 1, 1931

1,834,425

UNITED STATES PATENT OFFICE

JACOB RUPPERT SCHALK, OF RHINEBECK, NEW YORK

RAIL LOCKING DEVICE

Application filed July 25, 1929. Serial No. 380,880.

This invention relates to a rail locking device for securing the adjacent ends of guard or taff rails on vessels, although the invention may be employed for many other uses, where it is desired to secure the end of a hinged rail to the end of a stationary rail in such a manner that an even joint is produced as well as one of great strength.

The object of the invention is to provide a device for this purpose that is formed of two parts adapted to be secured upon the adjacent ends of the wooden rails, and of such a construction that they will interlock with each other when brought together.

Another object being to provide means mounted in said rail ends whereby they are locked against accidental opening, and yet said locking means is so placed as to be concealed, and produce the effect of a smooth rail.

A still further object of the invention is to provide in a device of this kind, a construction that is capable of being made at a minimum cost as by its design the machine work required is simple, and this tends to produce a cheap, durable and efficient article, containing few parts, and easily installed on new or old rails.

With these and other objects in view, my invention consists in certain construction and combination of parts as will hereinafter be fully described and claimed, and fully illustrated in the accompanying drawings which form a part hereof and in which like figures of reference refer to corresponding parts in all of the views, but it is understood that slight changes may be made without departing from the spirit of the invention.

In the drawings:—

Referring to the drawings:—

Figure 1:
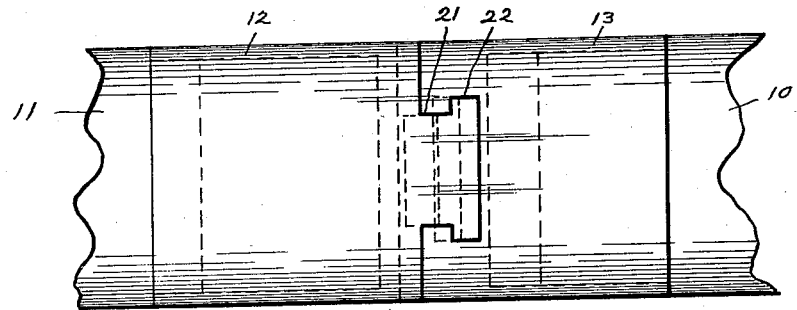
Figure 1 shows a top plan view of the two halves of the device in a locked position and as mounted on the rail ends.
Figure 2:
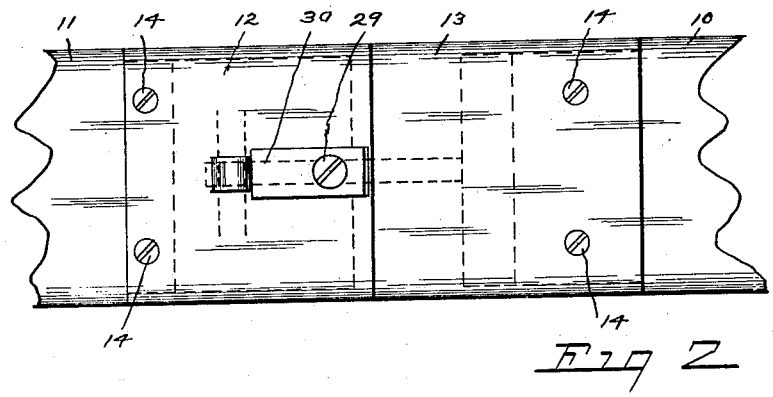
Figure 2 shows a bottom view of the same.
Figure 3:
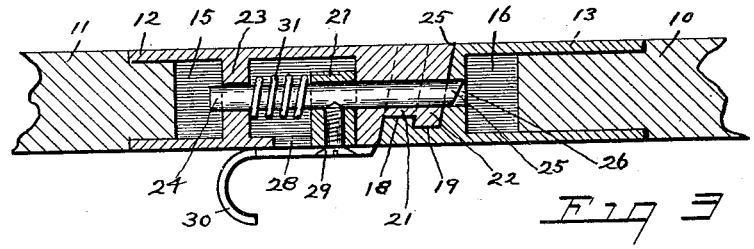
Figure 3 shows a side view of the same.
Figure 4:
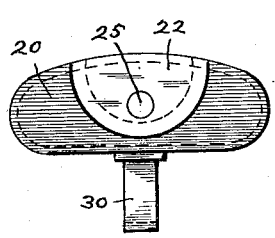
Figure 4 shows an end view of the movable part which is secured to the end of the movable rail.
Figure 5:
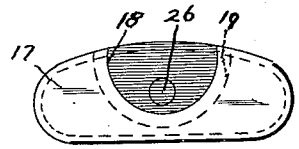
Figure 5 shows an end view of the part that is mounted on the stationary rail end.

The end of the stationary rail is indicated by the numeral 10 and the end of the movable rail section by the numeral 11.

The device comprises the two members 12 and 13, which are shaped on the top, sides and bottom to conform to the shape of the wooden rails to which they are mounted and secured by the screws or bolts 14; said members being formed with the orifices 15 and 16 for the reception of the rail ends as shown.

Taking first the member 13, the end of which is beveled at a slight angle depending upon the length of the movable rail section; and at a suitable distance back from said end 17 is formed a semi-circular cut-out 18 communicating with a concentric cut-out groove 19.

The second member is also formed with a beveled end 20 to abut and contact with the beveled end 17 of the member 12, when the two members are brought together.

The member 12 is provided with a projection from the end 20 in the form of a neck 21, of the required shape and size to fit the cut-out portion 18 in the member 13, and to the end of this neck 18 is secured or integral therewith a head 22. Of the shape and size to enter and fit the groove 19, in such a manner that when the members 12 and 13 are brought together an even joint is produced free from any holes or projections, and said members are prevented from passing each other except in the direction assumed in the lifting of the free end of the movable rail section, as in opening.

For securing these rail members in a closed and locked position, a bolt latch is here shown, but any suitable locking means may be provided, and may be key operated if desired.

As shown, the member 12, is provided with a transverse wall or boss 23 within which and projecting through a hole formed in the end 20, neck 21 and head 22, is mounted a sliding bolt 24, formed with a beveled end 25 adapted to strike the end of the member 13 as at 25, and enter a hole 26 formed in said end 13 and alined with the hole in the member 12 and the bolt 24.

For actuating said bolt 24, there is provided a block 27 mounted on said bolt 24 between the wall 23 and the end 20 and projecting through a slot 28 formed in the lower part of said member 12; and to this block is attached by the screw 29, which also secures the block to the bolt 24, a finger grip 30; and for retaining said bolt 24 in a normal engaging position a spring 31 is placed on said bolt 24 between said block 27 and the wall 23, and in this manner the bolt 24 may be pulled back to disengage from the member 13, allowing the movable rail to be opened.

Having thus described my invention, what I claim as new and desire to secure by Letters Patent, is:—

In a rail joint, a rail end having a hollow portion with a shoulder adjacent thereto, an abutting rail end having a projection and a groove adjacent thereto for engagement with said hollow portion and said shoulder respectively, when said rail ends are brought into engagement with one another, and means for locking said portions in said engaging position, comprising a bolt member mounted for reciprocation in one of said rail ends to project into the other of said ends, a block fixedly connected to said bolt, a spring engaging said block for normally urging said bolt to the locker position, a handle connected with said block for overcoming the resistance of said spring to move said bolt to the releasing position and a guide cooperating with said block for guiding said bolt in straight line reciprocation.

In testimony whereof I affix my signature.

JACOB RUPPERT SCHALK.